US010019487B1

(12) United States Patent
Domer et al.

(10) Patent No.: US 10,019,487 B1
(45) Date of Patent: *Jul. 10, 2018

(54) METHOD AND COMPUTER-READABLE MEDIA FOR PROVIDING RECOMMENDED ENTITIES BASED ON A USER'S SOCIAL GRAPH

(71) Applicant: Google Inc., Mountain View, CA (US)

(72) Inventors: Sebastian Domer, London (GB); Mat Balez, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 87 days.

This patent is subject to a terminal disclaimer.

(21) Appl. No.: 14/512,890

(22) Filed: Oct. 13, 2014

Related U.S. Application Data

(63) Continuation of application No. 13/665,644, filed on Oct. 31, 2012, now Pat. No. 8,886,625.

(51) Int. Cl.
*G06F 17/30* (2006.01)
*H04L 29/06* (2006.01)

(52) U.S. Cl.
CPC ........ *G06F 17/3053* (2013.01); *H04L 65/403* (2013.01); *G06F 17/30029* (2013.01); *G06F 17/30241* (2013.01)

(58) Field of Classification Search
CPC ......... G06F 17/30241; G06F 17/30029; H04L 65/403

(Continued)

(56) References Cited

U.S. PATENT DOCUMENTS 7,853,622 B1 * 12/2010 Baluja ............... G06F 17/30035
707/713
8,010,418 B1   8/2011 Lee
(Continued)

FOREIGN PATENT DOCUMENTS

JP      2009/104450 A      5/2009
WO    WO-2010/141656 A1   12/2010

OTHER PUBLICATIONS

Yu et al. Geo-Friends Recommendation in GPS-Based Ciber Physical Social Network, 2011, IEEE, International Conference on Advances in Social Network Analysis and Mining, pp. 361-368.*

(Continued)

*Primary Examiner* — Frantz Coby
(74) *Attorney, Agent, or Firm* — Marshall, Gerstein & Borun LLP (57) ABSTRACT

Provided are methods and computer-readable media for providing recommended entities based on a user's external social graph, such as asymmetric social graph of a social networking service. In some embodiments, entities responsive to a search query or other request may be obtained. Each entity may be evaluated to determine if the entity is associated with a contact from a user's social graph. The association may include an evaluation (e.g., a rating, review, other evaluation or combination thereof) of the entity by the contact. Additionally, the contacts having associations with an entity may be ranked based on a relationship score with a user. The entities having associations with the contacts from a user's social graph may be provided as recommended entities to the user, and the association may be annotated to the recommended entity for viewing by the user.

17 Claims, 9 Drawing Sheets

(58) Field of Classification Search
USPC .............. 707/705–706, 709, 723, 748, 769; 709/201, 203, 213, 217, 204
See application file for complete search history.

(56) References Cited

U.S. PATENT DOCUMENTS

| | | | |
|---|---|---|---|
| 8,014,943 B2 | 9/2011 | Jakobson | |
| 8,121,999 B2 | 2/2012 | Hansen et al. | |
| 8,221,999 B2 | 7/2012 | Kaufmann et al. | |
| 8,315,953 B1 | 11/2012 | Hansen et al. | |
| 8,478,527 B2 | 7/2013 | Jakobson et al. | |
| 8,510,287 B1* | 8/2013 | Wu ........................ | G06F 7/00 707/706 |
| 8,645,366 B1 | 2/2014 | Acharya | |
| 8,682,805 B1 | 3/2014 | Hansen et al. | |
| 8,700,540 B1 | 4/2014 | Zambrano et al. | |
| 8,764,561 B1* | 7/2014 | Lan ........................ | A63F 13/12 463/31 |
| 8,768,070 B2 | 7/2014 | Gelfand et al. | |
| 8,768,379 B2* | 7/2014 | Busch ..................... | H04W 4/02 370/338 |
| 8,832,136 B1* | 9/2014 | Billman ................. | G06Q 10/00 707/767 |
| 8,886,625 B1* | 11/2014 | Dorner et al. .......... | 707/706 |
| 8,959,083 B1 | 2/2015 | Gyongyi et al. | |
| 8,972,368 B1 | 3/2015 | de Sousa | |
| 9,009,226 B2* | 4/2015 | Kiciman ............... | G06Q 30/02 709/203 |
| 9,239,865 B1 | 1/2016 | Balez et al. | |
| 2007/0281689 A1 | 12/2007 | Altman et al. | |
| 2007/0281690 A1 | 12/2007 | Altman et al. | |
| 2007/0281716 A1 | 12/2007 | Altman et al. | |
| 2008/0070593 A1 | 3/2008 | Altman et al. | |
| 2008/0228776 A1 | 9/2008 | Weiss et al. | |
| 2008/0268876 A1 | 10/2008 | Gelfand et al. | |
| 2009/0111487 A1 | 4/2009 | Scheibe | |
| 2009/0150373 A1 | 6/2009 | Davis et al. | |
| 2009/0281719 A1 | 11/2009 | Jakobson | |
| 2009/0324103 A1 | 12/2009 | Gelfand et al. | |
| 2010/0076968 A1* | 3/2010 | Boyns ................. | G06F 17/30241 707/732 |
| 2010/0174709 A1 | 7/2010 | Hansen et al. | |
| 2010/0262658 A1 | 10/2010 | Mesnage | |
| 2010/0312644 A1 | 12/2010 | Borgs et al. | |
| 2011/0035329 A1 | 2/2011 | Delli Santi et al. | |
| 2011/0087534 A1* | 4/2011 | Strebinger ............ | G06Q 10/06 705/14.25 |
| 2011/0087745 A1 | 4/2011 | O'Sullivan et al. | |
| 2011/0113100 A1 | 5/2011 | Chawla | |
| 2011/0137818 A1* | 6/2011 | Goad ..................... | G06Q 30/02 705/347 |
| 2011/0184953 A1* | 7/2011 | Joshi ................... | G06F 17/30241 707/738 |
| 2011/0238762 A1 | 9/2011 | Soni et al. | |
| 2011/0264370 A1 | 10/2011 | Jakobson et al. | |
| 2011/0264528 A1 | 10/2011 | Whale | |
| 2011/0276565 A1* | 11/2011 | Zheng ................... | G01C 21/20 707/724 |
| 2011/0307466 A1* | 12/2011 | Prakash ............. | G06F 17/30864 707/707 |
| 2011/0307478 A1* | 12/2011 | Pinckney .............. | G06N 99/005 707/724 |
| 2012/0078916 A1 | 3/2012 | Tseng | |
| 2012/0096352 A1 | 4/2012 | Maor et al. | |
| 2012/0124039 A1* | 5/2012 | Sandholm .......... | G06Q 30/0611 707/724 |
| 2012/0136852 A1* | 5/2012 | Geller ............... | G06F 17/30528 707/722 |
| 2012/0143963 A1 | 6/2012 | Kennberg et al. | |
| 2012/0233238 A1* | 9/2012 | Braginsky .......... | G06Q 30/0261 709/203 |
| 2012/0271541 A1 | 10/2012 | Hjelm et al. | |
| 2013/0031106 A1 | 1/2013 | Schechter et al. | |
| 2013/0041733 A1* | 2/2013 | Officer ................... | G06Q 30/02 705/14.16 |
| 2013/0054407 A1* | 2/2013 | Sabur ..................... | G06Q 50/01 705/26.7 |
| 2013/0073280 A1* | 3/2013 | O'Neil ................. | G06F 17/2881 704/9 |
| 2013/0073632 A1* | 3/2013 | Fedorov ................ | G06Q 10/101 709/205 |
| 2013/0073686 A1* | 3/2013 | Sandholm .......... | G06Q 30/0631 709/219 |
| 2013/0073983 A1* | 3/2013 | Rasmussen ............ | G06Q 30/02 715/753 |
| 2013/0086641 A1 | 4/2013 | Mehr et al. | |
| 2013/0097162 A1 | 4/2013 | Corcoran et al. | |
| 2013/0173633 A1 | 7/2013 | Piepgrass et al. | |
| 2013/0185355 A1* | 7/2013 | Tseng ................... | H04L 65/403 709/204 |
| 2013/0218680 A1 | 8/2013 | Forsblom | |
| 2013/0318180 A1* | 11/2013 | Amin .................... | H04L 65/403 709/206 |
| 2013/0346233 A1 | 12/2013 | Caralis et al. | |
| 2014/0025490 A1* | 1/2014 | Shekar ............... | G06Q 30/0255 705/14.53 |
| 2014/0149240 A1 | 5/2014 | Ansel et al. | |
| 2014/0149845 A1 | 5/2014 | Ansel et al. | |
| 2014/0149846 A1 | 5/2014 | Ansel et al. | |
| 2014/0156746 A1* | 6/2014 | Wheatley ................ | H04L 67/22 709/204 |
| 2014/0164511 A1 | 6/2014 | Williams et al. | |
| 2014/0250191 A1 | 9/2014 | Altman et al. | |
| 2015/0006333 A1 | 1/2015 | Silveira et al. | |
| 2015/0007022 A1 | 1/2015 | Chen et al. | |
| 2015/0039690 A1* | 2/2015 | Jackson ............ | G06F 15/17306 709/204 |
| 2015/0213367 A1* | 7/2015 | Flinn ................. | G06F 17/30699 706/46 |
| 2015/0381556 A1* | 12/2015 | Ahrens ................. | G06Q 10/10 707/738 |

OTHER PUBLICATIONS

Bandara, Udana et al., "Tagciti: A Practical Approach for Location-Aware and Socially Relevant Information Creation and Discovery for Mobile Users," IEEE ISWCS, 2008, pp. 118-122.
U.S. Appl. No. 14/603,758, filed Jan. 23, 2015.

* cited by examiner

METHOD AND COMPUTER-READABLE MEDIA FOR PROVIDING RECOMMENDED ENTITIES BASED ON A USER'S SOCIAL GRAPH

CROSS-REFERENCE TO RELATED APPLICATIONS

The present application is a continuation of pending U.S. patent application Ser. No. 13/665,644, filed 31 Oct. 2012, titled "METHODS AND COMPUTER-READABLE MEDIA FOR PROVIDING RECOMMENDED ENTITIES BASED ON A USER'S SOCIAL GRAPH." The parent application is hereby incorporated by reference in its entirety for all purposes.

BACKGROUND OF THE INVENTION

1. Field of the Invention

This invention relates generally to computer-implemented searching of a geographic area and, more particularly, to providing businesses and other entities of interest to a user.

2. Description of the Related Art

The Internet is useful for a variety of purposes. For example, users may use the Internet to search geographic areas, such as to retrieve information about businesses or other entities located in a geographic area. Although information about such entities may be generally available in some form, the information, and the presentation of the information, may be nearly random and unstructured and may not present interesting information to a user. Additionally, the sources for such information may be unknown to user, or the user may find the sources for such information to be unreliable or untrustworthy. Consequently, a user may be unable to easily determine entities in a geographic area that are of interest to the user.

SUMMARY OF THE INVENTION

Various embodiments of methods and systems for providing recommended entities based on a user's social graph are provided herein. In some embodiments, provided is a computer-implemented method for determining recommended entities based on a user's social graph. The method includes obtaining, by one or more processors, a geographic location associated with the user, obtaining, by one or more processors, a plurality of entities located in the geographic location, obtaining, by one or more processors, a plurality of contacts from an asymmetric social graph for the user, and determining, by one or more processors, a first one of the plurality of entities having one or more associations with a respective one or more of the plurality of contacts. The method further includes selecting, by one or more processors, one of the one or more associations and providing association information from the selected one of the one or more associations for display with the plurality of entities.

Additionally, in some embodiments, provided is a non-transitory tangible computer-readable storage medium having executable computer code stored thereon, the code comprising a set of instructions that, when executed by one or more processors, causes a computer to: obtain a geographic location associated with a user; obtain a plurality of entities located in the geographic location; obtain a plurality of contacts from an asymmetric social graph for the user; determine a first one of the plurality of entities having one or more associations by a respective one or more of the plurality of contacts; select one of the one or more associations; and provide association information from the selected one of the one or more associations for display with the plurality of entities.

Further, in some embodiments, provided is a method for determining recommended entities based on a user's social graph. The method includes receiving, at one or more processors, a search query associated with a user, obtaining, by one or more processors, a plurality of entities that match the search query, obtaining, by one or more processors, a plurality of contacts from an asymmetric social graph for the user, determining, by one or more processors, a first one of the plurality of entities having one or more associations by a respective one or more of the plurality of contacts, selecting, by one or more processors, one of the one or more associations, and providing association information from the selected one of the one or more associations for display with the plurality of entities, the plurality of entities displayed as ordered search results responsive to the query, the first one of the plurality of entities displayed in a first group in the ordered search results and the other plurality of entities displayed in a second group in the ordered search results.

Moreover, in some embodiments, provided is a non-transitory tangible computer-readable storage medium having executable computer code stored thereon, the code comprising a set of instructions that, when executed by one or more processors, causes a computer to: receive a search query associated with a user; obtain a plurality of entities that match the search query; obtain a plurality of contacts from an asymmetric social graph for the user; determine a first one of the plurality of entities having one or more associations by a respective one or more of the plurality of contacts; select one of the one or more associations; and provide association information from the selected one of the one or more associations for display with the plurality of entities, the plurality of entities displayed as ordered search results responsive to the query, the first one of the plurality of entities displayed in a first group in the ordered search results and the other plurality of entities displayed in a second group in the ordered search results.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

As discussed in more detail below, provided in some embodiments are systems and methods for providing recommended entities in a geographic area based on contacts from a user's external social graph, such as an asymmetric social graph of a social networking service. In some embodiments, in response to a search query or in a landing webpage for a geographic area, those entities having evaluations or other associations by contacts in the user's social graph that are presented as recommended entities in the search results.

In some embodiments, as mentioned above, the entities are presented in a landing webpage for a geographic area or in response to a search query for entities in a geographic area. Each entity may be evaluated to determine whether contacts from a user's social graph have provided an evaluation (e.g., a review, rating, or other evaluation) or are otherwise associated with the entity. The entities having such associations are provided as recommended entities and may be visually distinguished in the search results or landing page. Additionally, the association information, such as review text, ratings, name of the associated contact, and other information, may be annotated to the entities presented in the search results or the landing page. In some embodiments, multiple contacts associated with an entity are ranked based on relationship criteria, and the association information from the highest ranked contact may be annotated to the recommended entity. Additionally, a user may select a recommended entity and be presented with the additional associations and contacts associated with the entity. Further, in some embodiments, a flag may be included to indicate if a user's association information should be annotated to a recommended entity.

Figure 1:
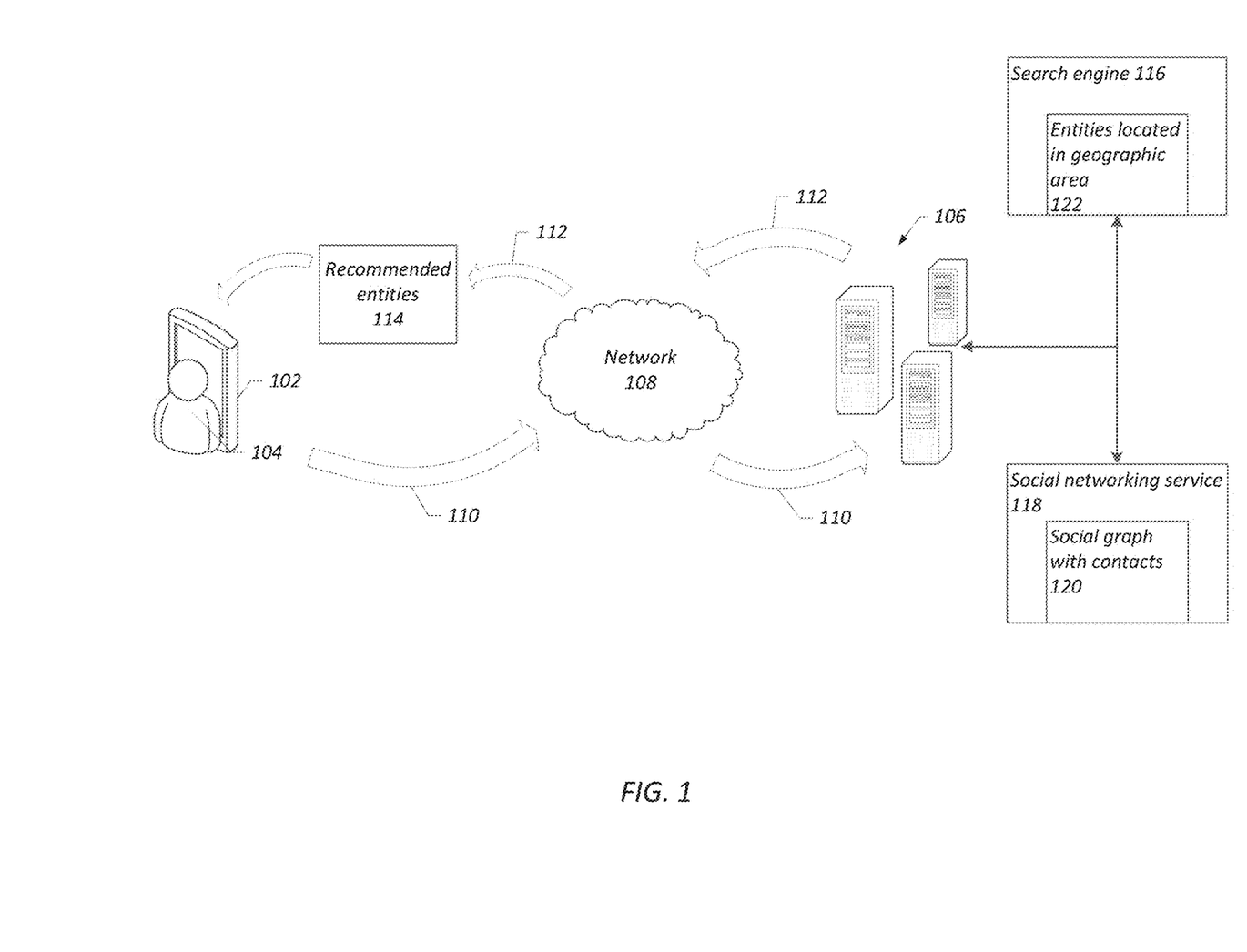
FIG. 1 is a diagram of a system for providing recommended entities in accordance with an embodiment of the present invention.

FIG. 1 is a diagram of a system 100 in accordance with an embodiment of the present invention. As shown in FIG. 1, the system 100 may include a client computer 102, e.g., a portable computer, for use by a user 104. The system may include servers 106 for providing services, webpages, and other data to the client computer 102, and the servers 106 and client computer 102 may communicate over a network 108. The client computer 102 may include laptop computers, tablet computers, smartphones, personal digital assistants, etc., and may include a receiver for a satellite-based positioning system, such as a Global Positioning System (GPS) receiver. In some embodiments, the client computer 102 may include a desktop computer. The user 104 may use the portable computer 102 to retrieve information, view interactive maps, and perform searches, such as by searching the World Wide Web using a web-based search engine or by searching an interactive map of a geographic area. Such geographic areas may include postal codes, cities, states, districts, provinces, neighborhoods, countries, areas near a specific address, or any other suitable geographic area. Additionally, as described below, the user 104 may use the client computer 102 to interact with a social networking service.

The servers 106 may include a single server (in a discrete hardware component or as a virtual server) or multiple servers. The servers 106 may include web servers, application servers, or other types of servers. Additionally, the servers 106 may be, for example, computers arranged in any physical and virtual configuration, such as computers in one or more data processing centers, a distributed computing environment, or other configuration. Such configurations may use the network 108 for communication or may communicate over other networks.

The client computer 102 and servers 106 are in communication with the network 108, such as through a wired or wireless network interface. In some embodiments, the network 108 may include multiple networks, and may include any suitable network and networking technology, such as the Internet, an intranet, a local area network (LAN), a wide area network (WAN), or any other suitable network. Additionally, the network 108 may include a wired network, a wireless network, or both. Moreover, it should be appreciated that the client computer 102 and servers 106 may communicate over different networks separately and simultaneously. For example, the client computer 102 may communicate over both a wireless Ethernet network and a cellular network.

As described in more detail below, the user 104 may use the client computer 102 to search a geographic area. In some embodiments, the search may be performed automatically, such as by performing a search of a geographic area based on a location received from the client computer 102, such as a location determined by a satellite-based positioning system. In such embodiments, a request 110 is transmitted from the client computer 102 and over the network 108 to the servers 106. In response, the servers 106 may transmit a response 112 having recommended entities 114. As used herein, the term "entity" refers to a private or public entity having a physical location, such as a business (e.g., restaurant, bar, store, etc.), a public facility (e.g., a park, library, etc.), a government office (e.g., Department of Public Safety (DPS) office, courthouse), etc.

As described in further detail below, the recommended entities 114 are determined from the entities having associations with (e.g., evaluated by) the contacts of a user's external social graph, such as a social graph of a social networking service. The response may be transmitted over the network 108, and the recommended entities 114 are received by the client 102 and displayed to the user 104. Additionally, in some embodiments and as described further below, the recommended entities 114 are annotated with association information such as review text, ratings, other association information, or a combination thereof.

The servers 106 may include or be in communication with a search engine 116 and a social networking service 118. These components may communicate over the network 108, such as the Internet, an intranet, a local area network (LAN), a wide area network (WAN), or any other suitable network. The social networking service 118 includes an external social graph 120 for a user, such as one or more contacts having a relationship with the user as defined by the social networking service 118. As used herein, the term "external social graph" refers to a social graph that is external to the other components of the system 100. The external social graph may be defined independently of the other components of the system, such as the search engine 116. For example, the external social graph 120 of the social networking service 118 may be separate and independent relative to the other components of the system 100.

The search engine 116 may retrieves entities 122 located in a geographic area, such as in response to a request from the client computer 102. As described further below, the recommended entities 114 may be determined based on associations with contacts from the social graph 120, such as evaluations (e.g., ratings and reviews) of the entities by the contacts. The recommended entities 114 and other entities responsive to a request are provided to the client computer 102 for display to a user. As described below, the recommended entities 114 are displayed at a higher rank in a ranked of entities or may be otherwise distinguished. Accordingly, because the recommended entities 114 are determined from the user's social graph 120, they may be of particular interest to the user, and the reviews, ratings or other evaluations from contacts of the user's social graph of the entities may also be of particular interest.

Figure 2:
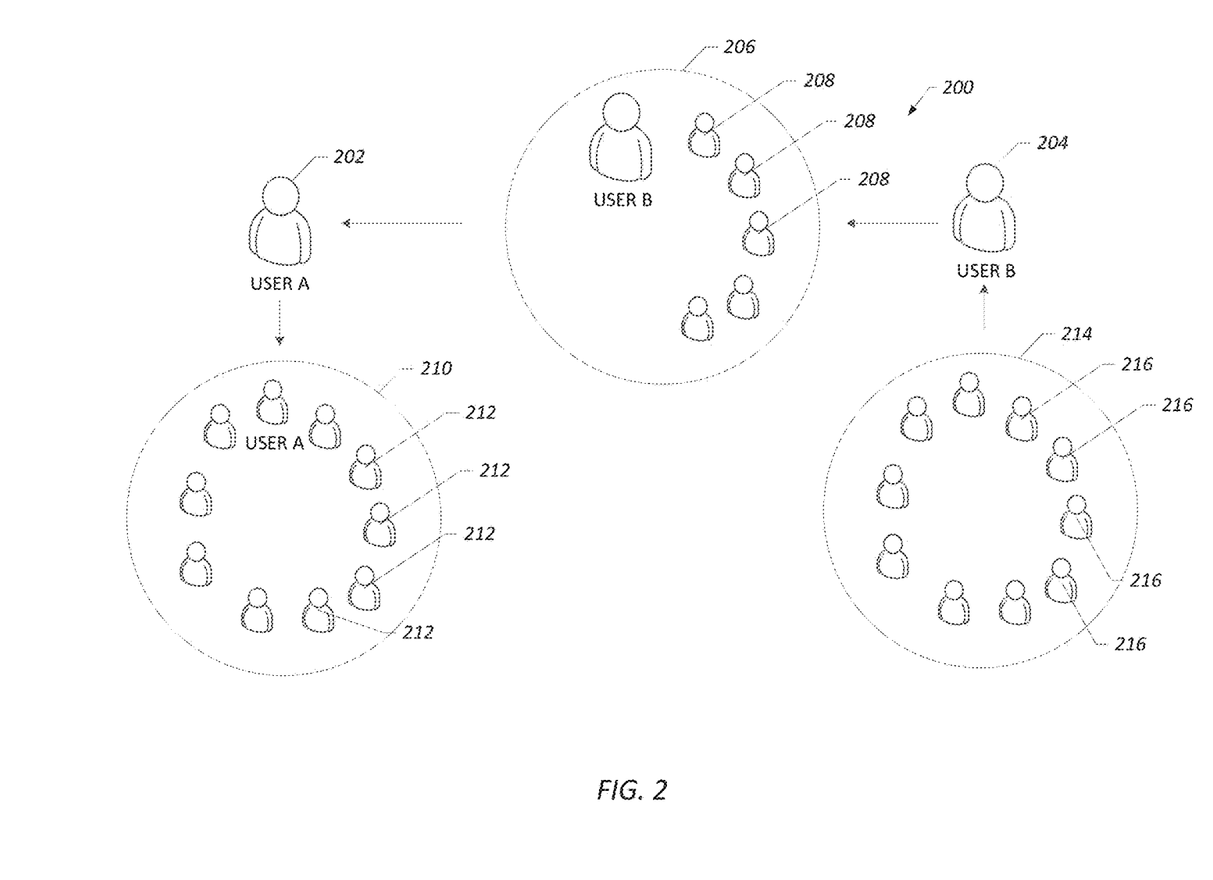
FIG. 2 is a diagram of a model of an asymmetric social graph in accordance with an embodiment of the present invention.

In some embodiments, a user's social graph includes an asymmetric social graph. FIG. 2 depicts a model 200 of asymmetric social graphs for a user 202 (User A) and a user 204 (User B) in accordance with embodiments of the present invention. As shown in FIG. 2, the user 202 (User A) has a social graph 206. In some embodiments, the organization of contacts in a social graph may include or be referred to as a "circle." User A's social graph 206 includes contacts such as User B and other contacts 208. In an asymmetrical social graph, the User A receives updates (e.g., status updates, location updates, news feeds, posts, etc.) from the contacts of social graph 206, such as from User B. However, because of the asymmetric nature of the social graph 206, the contacts included in social graph 206 do not receive updates from User A. In contrast, User A may be included in another user's social graph 210 having contacts 212. Thus any updates provided by User A may be viewed by the user having the social graph 210.

Similarly, the user 204 (User B) may have a social graph 214 that includes contacts 216. Accordingly, as described above, any updates provided by the contacts 216 are viewed by User B; however, the contacts 216 included in the social graph 214 do not receive updates from User B. In this manner, asymmetrical social graphs are maintained for a user such that the user receive updates from the contacts included in their social graphs, and the contacts included in these social graphs do not receive updates from the user. In some embodiments, a social graph for a user includes multiple circles, groups, or other organizations, and each user may also be included in multiple circles of other users.

Figure 3:
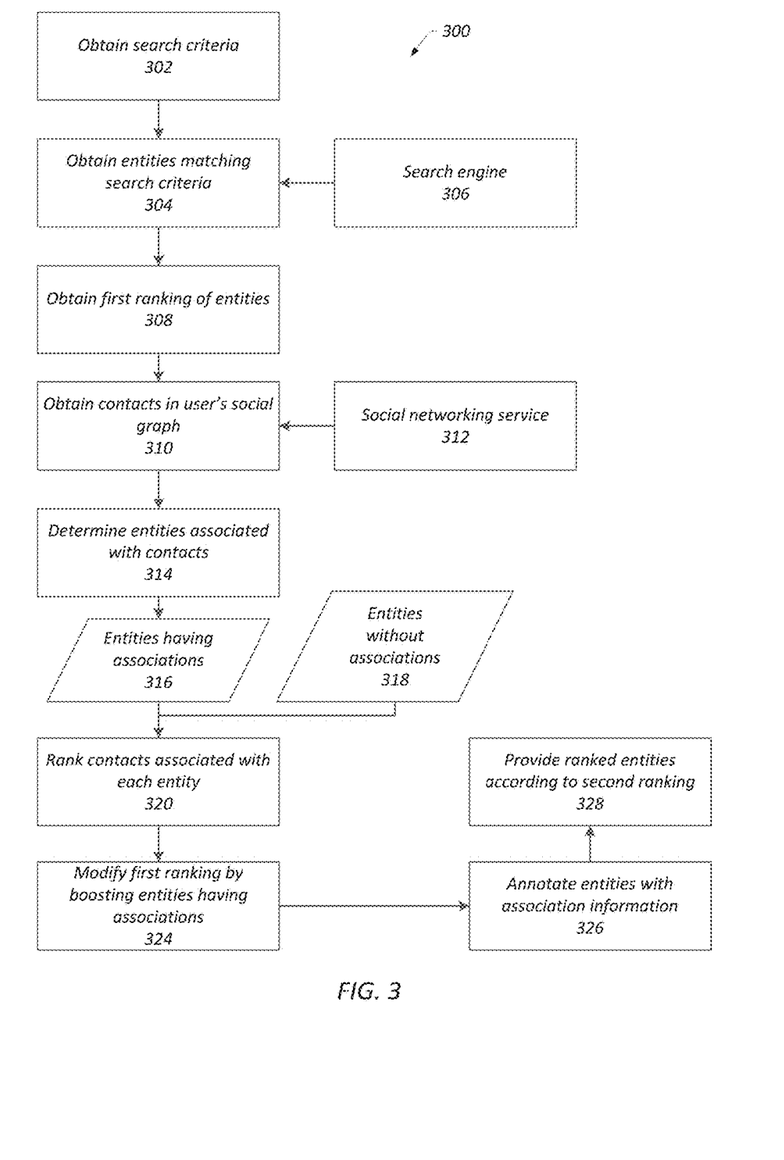
FIG. 3 is a block diagram of a process for determining and providing recommended entities in accordance with another embodiment of the present invention.

FIG. 3 depicts a process 300 for determining and providing recommended entities in accordance with an embodiment of the present invention. Some or all steps of the process 300 may be implemented as executable computer code stored on a non-transitory tangible computer-readable storage medium and executed by one or more processors of a special-purpose machine, e.g., a computer programmed to execute the code. Initially, search criteria are obtained (block 302). As noted above, the search criteria include a geographic area, a search query, or a combination thereof and may include searches for types of entities, entities located in a geographic area, or types of entities located in a geographic area, and is entered by and received from a user. Additionally, a geographic area is entered by a user, or, in other embodiments, the geographic area is based on a location received from a computer and determined by a satellite-based positioning system, or a location determined by Internet Protocol (IP) address geolocation. Next, the entities matching the search criteria are determined (block 304) from a search engine 306. For example, the entities located in a geographic area (e.g., San Francisco) are determined by the search engine 306, or entities matching a search query (e.g., "pizza") are determined by the search engine 306. Additionally, a first ranking of the entities matching the search criteria are obtained (block 308). The first ranking is provided by the search engine 306 or obtained from data included with the entities. The first ranking is based on a first set of ranking criteria, such as popularity (popularity of an entity), relevance (how well an entity matches a search query), and location (the distance between an entity and a specified geographic location).

Next, the contacts for a user's external social graph are obtained (block 310), such as from a social networking service 312. As described above, the social graph is external to the search engine 306. Thus, a user manages the external social graph via the social networking service 312 without interacting with the search engine 306 or other services or systems. For example, the social networking service 312 is provided from a different service provider than the search engine 306.

Moreover, as noted above, in some embodiments the social networking service 312 provides an asymmetric social graph. Further, in some embodiments the asymmetric social graph has one or more groups, circles, or other organization of a user's contacts. After obtaining the entities for the search criteria and the contacts from a user's external social graph, the entities having associations with the contacts are determined (314). As described further below, an association may be determined based on any suitable interaction between a contact and an entity, such as a contact's review of the entity, a contact's rating of the entity, a contact's "check-in" or "check-out" from an entity, and the like. Moreover, an entity may have one or more associations with a contact, and an entity may have associations with one or more contacts.

Each association may include association information describing details about the association. For example, if the association is based on an evaluation (e.g., a review, a rating, or a combination thereof) of the entity by the contact, the association information may include the date and time of the evaluation, review text, a rating, and so on. Additionally, the association information may include the name of the associated contact and a picture of the associated contact. Further, in some embodiments, the association may include an image, such as an image provided by the associated contact.

Accordingly, the entities 316 having associations with a user's contacts and the entities 318 without associations with a user's contacts are determined. For each of the entities 316 having associations, the contacts associated with each entity are ranked (block 320) based on relationship criteria describing a relationship between the contact and the user. The relationship criteria include the number of interactions between a contact and a user and the type of interactions between a contact and user. For example, those contacts having a higher qualitative relationship with the contact may be ranked higher than those contacts having a lower qualitative relationship. Next, the first ranking of the entities (i.e., both the entities 316 having associations and the entities 318 without associations) is modified based on the associations (block 324) to produce a re-ranked order of entities. For example, the entities 316 having associations are "boosted" so as to increase their rank in the order of re-ranked entities.

Next, the entities having associations are annotated with association information from the association (block 326). For example, if the association between an entity and a contact was based on a contact's review of the entity, the entity is annotated with some or all of the text from the review. Similarly, if the association between an entity and a contact was based on a contact's rating of the entity, the entity is annotated with the rating. In some embodiments, a flag or other indicator associated with a contact is read to determine if a contact allows the reviews, ratings, or other evaluations to be public. Additionally, an entity may be annotated with information from multiple interactions, such as combination of a ranking and text from a review, multiple associations, or a combination thereof. Next, the entities are provided according to a second ranking, and the annotated entities are provided as recommended entities for a user (block 328). In some embodiments, the second ranking may be the modified first ranking (block 324) or may be a new ranking based on or independent from the modified first ranking Additionally, as described below in FIGS. 6 and 7, the recommended entities are displayed in a separate section in the results and may be presented with the annotated association information to indicate to a user why the entity is recommended.

Figure 4:
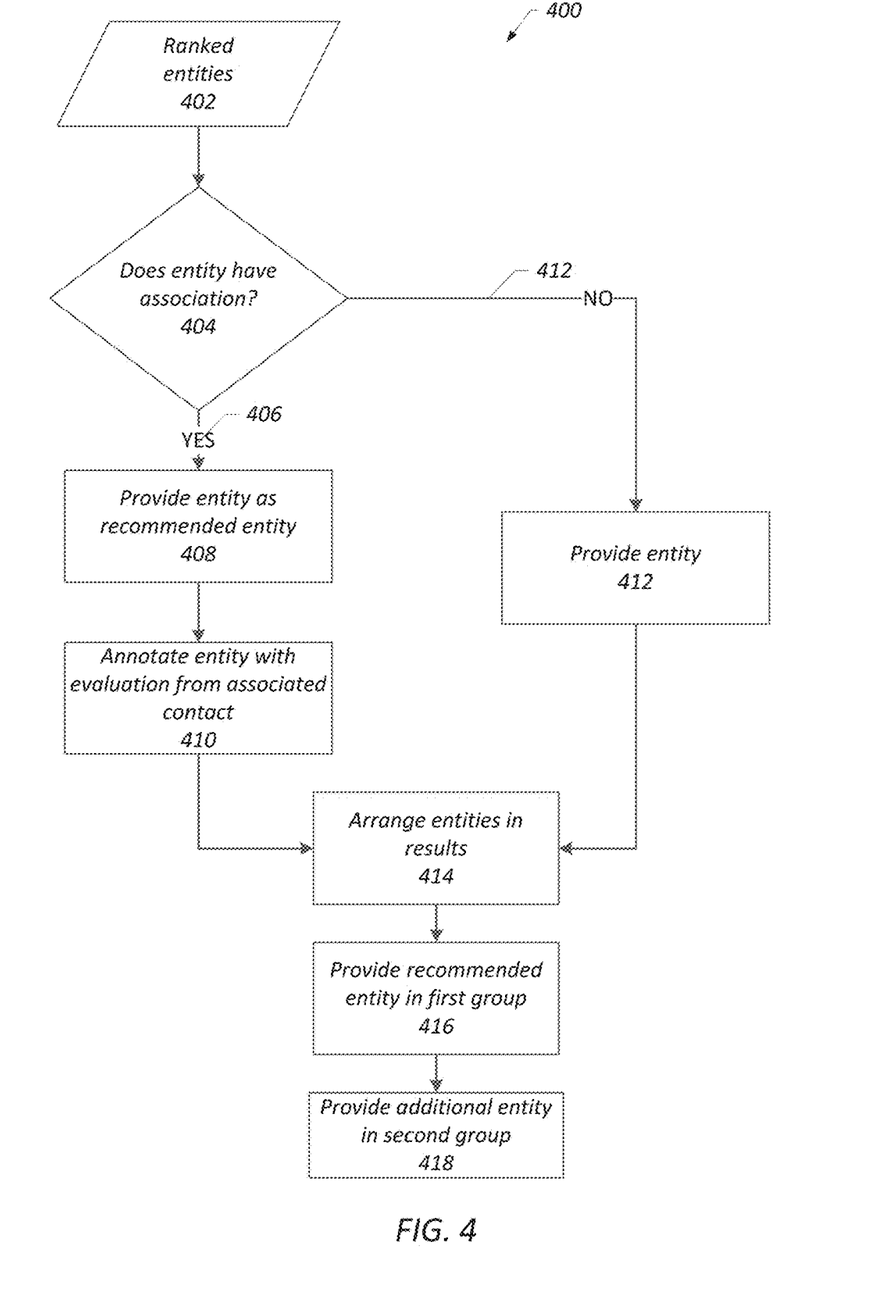
FIG. 4 is a block diagram of a process for further processing recommended entities in accordance with another embodiment of the present invention.

After determining and ranking entities that have contact associations, the ranked entities are further processed to display recommended entities to a user. FIG. 4 depicts a process 400 for further processing ranked entities 402 in accordance with an embodiment of the present invention. Some or all steps of the process 400 may be implemented as executable computer code stored on a non-transitory tangible computer-readable storage medium and executed by one or more processors of a special-purpose machine, e.g., a computer programmed to execute the code. Initially, as described above, ranked entities 402 are determined, such that those entities having associations with contacts from a user's external social graph have a higher rank than entities without such associations. Each entity is then evaluated to determine if the entity has an association with a contact (decision block 404).

If an entity has an association with a contact (line 406), the entity is provided as a recommended entity (block 408). Additionally, as shown in detail below, the entity may be annotated with an evaluation and other association information, such as the name of the contact, and an image associated with the contact (block 410). If the entity does not have an association with a contact (line 412), the entity is provided in the results but is not provided as a recommended entity.

Next, the entities are arranged based on the determination of recommended entities (block 414). In some embodiments, recommended entities are displayed in a different group, in a higher position in an ordered arrangement, visually highlighted, or otherwise distinguished from the additional entities. For example, in some embodiments the recommended entity is provided in a first group (block 416) and the additional entity without associations is provided in a second group (block 418). As described below in FIGS. 6 and 7, the first group of recommended entities is displayed in a different position on a webpage or other presentation viewed by a user.

Figure 5:
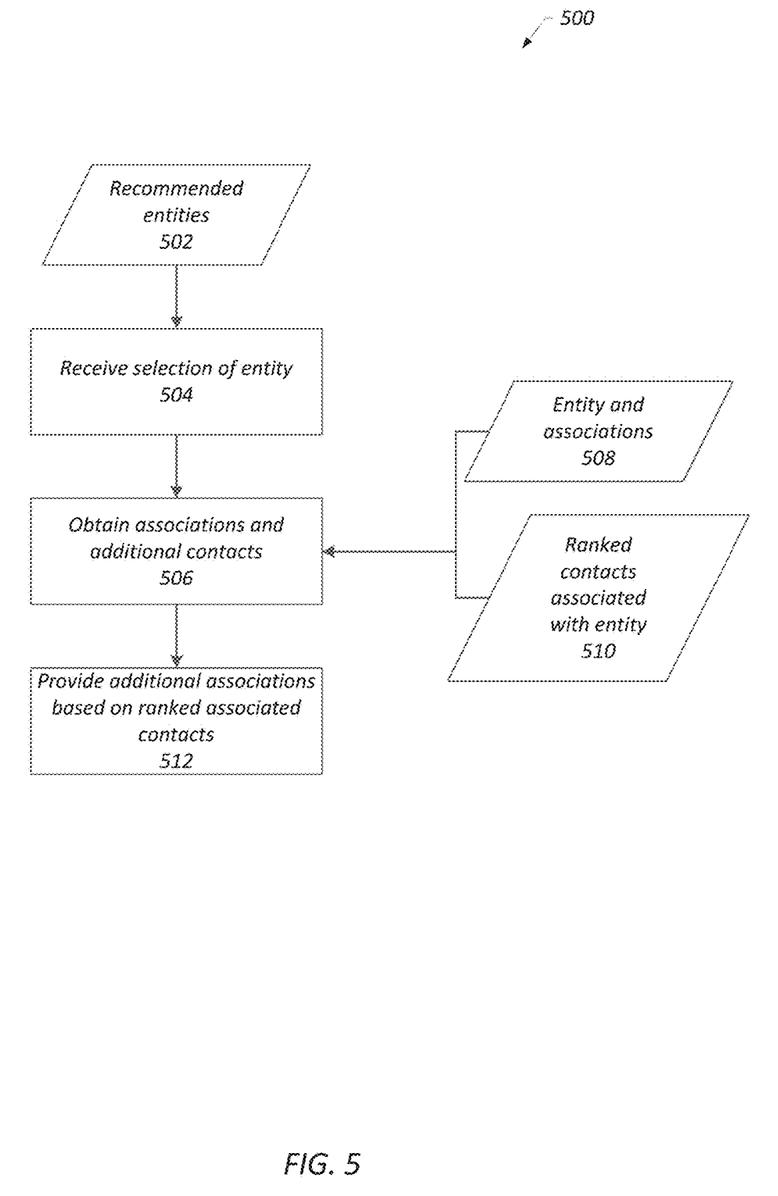
FIG. 5 is a block diagram of a process for processing user selections of a recommended entity in accordance with an embodiment of the present invention.

After providing entities and associations (e.g., evaluations) to a user, a user may select a recommended entity to view additional contacts associated with the entity. FIG. 5 depicts a process 500 for processing user selections of recommended entities in accordance with an embodiment of the present invention. Some or all steps of the process 500 may be implemented as executable computer code stored on a non-transitory tangible computer-readable storage medium and executed by one or more processors of a special-purpose machine, e.g., a computer programmed to execute the code. Initially, the recommended entities 502 (i.e., entities having associations) for a user are determined and provided to user, such as by the processes described above in FIGS. 3 and 4. Next, a user selection of a recommended entity is received (block 504). For example, a user may click or otherwise select a recommended entity from a webpage.

After the selection, the additional associations and associated contacts for the selected entity are obtained (block 506). The additional associations are obtained from previously determined entity and associations 508, and associated contacts are obtained from ranked contacts 510 associated with the entity. The previously determined entity and associations 508 and the ranked associated contacts 510 are determined in the manner described above in FIGS. 3 and 4. The associations for the selected entity are then provided based on the ranking of associated contacts (block 512) according to relationship criteria. For example, the associations from higher ranked contacts are displayed at a higher rank in a list of associations associated with the selected entity.

Figure 6:
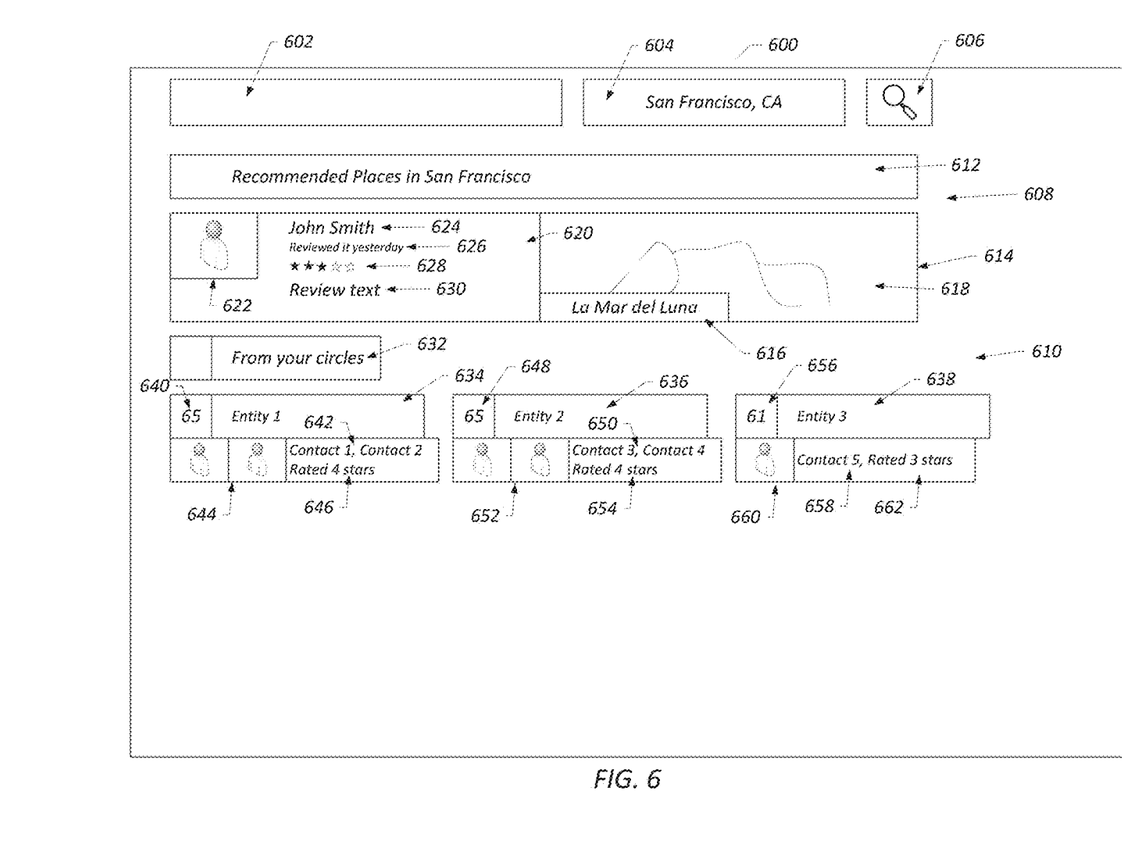
FIG. 6 is a schematic of a screenshot illustrating the display of recommended entities and association information determined in accordance with an embodiment of the present invention.

FIG. 6 depicts a screenshot 600 illustrating the display of recommended entities and associations determined in accordance with an embodiment of the present invention. The screenshot 600 is from a browser or other application executing on a client computer, such as the client computer 102 described above. For example, the screenshot 600 depicts a webpage, such as landing webpage for a geographic area. The screenshot 600 depicts elements of a browser or other application, such as a search field 602, a location field 604, and a search button 606. Additionally, the screenshot 600 depicts a first results section 608 and a "second results section 610.

The search field 602 provides for the entry of text for a search query, such as a search query for a type of entity or entities located in a geographic area. The search button 606 provides for a user to execute a search. For example, a user enters text in the search field 602 and select (e.g., click) the button 606. As mentioned above, a user may search for a location, for the type of entities located in a geographic area or for specific entities. The location field 604 displays a geographic area of interest (e.g. "San Francisco, CA") that may indicate a context for the landing webpage. In some embodiments, the geographic area of interest is determined from the location of a client computer, such as from a location determined via a satellite-based positioning system, IP address geolocation, etc. In other embodiments, the geographic area of interest is manually input by a user, such as by entering a location in the search field 602.

The first results section 608 includes a title bar 612 indicating the description of the first results section 608. Additionally, the first results section 608 may display a recommended entity 614, such as by displaying the name 616 (e.g., "La Mar del Luna") and a picture 618 of the entity. As described above, the recommended entity 614 is based on an association with the contacts from a user's social graph. As also described above, the recommended entity 614 may also include association information 620 annotated to the recommended entity 614. For example, the association information 620 includes a picture 622 of the contact, the name 624 of the contact (e.g., "John Smith"), the date 626 of the association (e.g., "Reviewed it yesterday"), a rating 628 of the entity by the contact, and review text 630 from the review of the entity by the contact. As described above, the association 620 for the recommended entity 614 is determined by ranking the contacts associated with the entity 614 and selecting the highest ranked associated contact. Additionally, the recommended entity 614 is the highest ranked recommended entity based on the entity rankings described, such as a modified ranking of entities.

Additionally, the second results section 610 may include additional recommended entities based on the processing described above. The second entity section 610 includes a title bar 632 (e.g., "From your circles") indicating the basis for of the entities included in the second entity section 610. The second entity section 610 is indicated as including additional entities from a user's social graph, e.g., from the user "circles." The second entity section 610 includes a second recommended entity 634, a third recommended entity 636, and a fourth recommended entity 638. Each entity is displayed with a rating unassociated with the user's contacts (e.g., a composite rating from a review website or other independent source). Additionally, each entity is annotated with the corresponding association information. As shown in FIG. 6, the second recommended entity 634 is displayed with an unassociated rating 640 (e.g., 65), names 642 (e.g., "Contact 1," "Contact 2") of the associated contacts, and the pictures 644 of the associated contacts. Additionally, a rating 646 (e.g., "Rated 4 stars") of the entity by the entity-associated contacts 642 is displayed. In some embodiments, the contacts having identical ratings are grouped and displayed, and the displayed rating 646 may be this identical rating. In other embodiments, contacts having different ratings may be grouped and displayed, and the displayed rating 646 is an average or other composite of the different ratings.

Additionally, the third recommended entity 636 is displayed with an unassociated rating 648 (e.g., 65), names 650 (e.g., "Contact 3," "Contact 4") of the associated contacts, and the pictures 652 of the entity-associated contacts. Additionally, an evaluation, such as rating 654 (e.g., "Rated 4 stars) of the entity by the associated contacts 650 is displayed. Similarly, the fourth recommended entity 638 is displayed with an unassociated rating 656 (e.g., 65), a name 658 (e.g., "Contact 5") of the associated contact, and a picture 660 of the associated contact 658. Here again, an evaluation, such as a rating 662 (e.g., "Rated 3 stars"), of the entity by the entity- associated contacts 650 is displayed.

Figure 7:
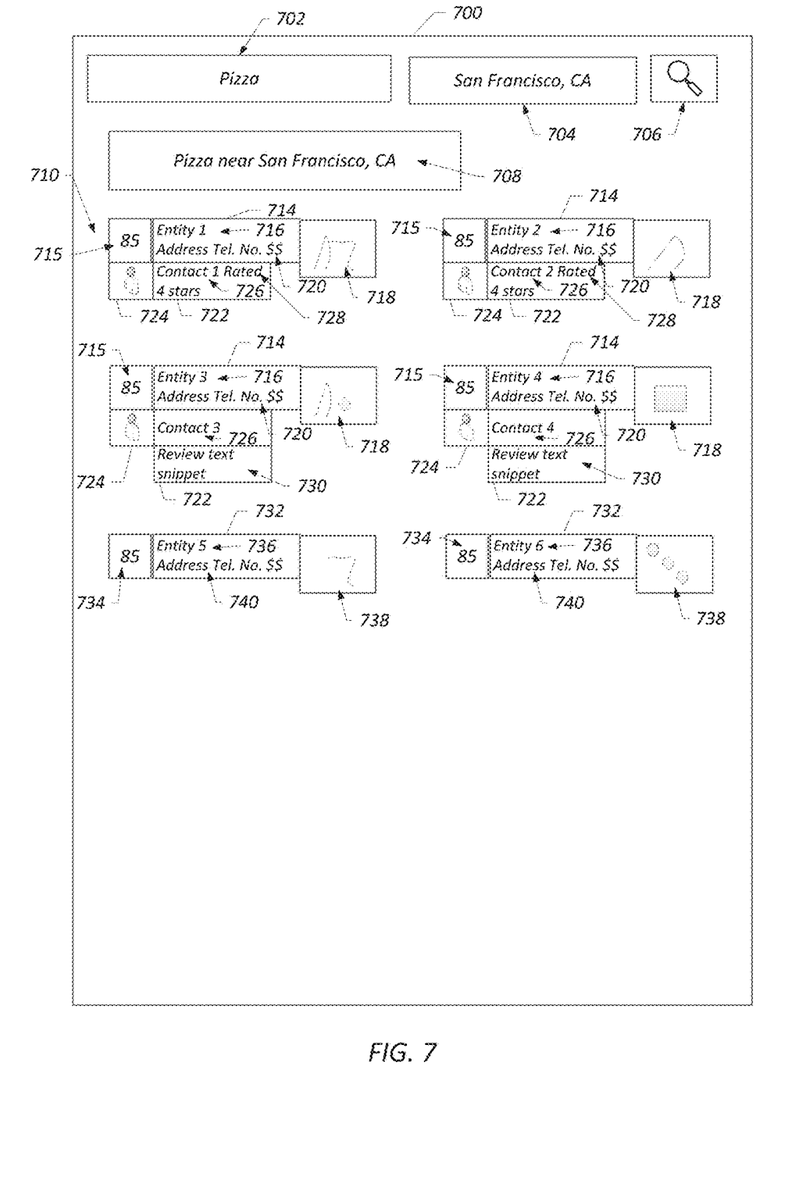
FIG. 7 is a schematic of a screenshot illustrating the display of search results having recommended entities and annotated association information in accordance with an embodiment of the present invention.

In other embodiments, the associations from entity-associated contacts are annotated to recommended entities displayed as search results responsive to a user's search. FIG. 7 depicts a screenshot 700 illustrating the display of search results having recommended entities and annotated associations in accordance with an embodiment of the present invention. The screenshot 700 is from a browser or other application executing on a client computer, such as the client computer 102 described above. For example, the screenshot 700 depicts a webpage, such as a webpage of web-based search engine, etc. The screenshot 700 depicts a search field 702, a location field 704, and a search button 706. Additionally, the screenshot 700 depicts a search title bar 708 and a search results section 710.

The search field 702 provides for the entry of text for a search query, such as a search query that includes a location or type of entity. The search button 706 provides for a user to execute a search. For example, a user may enter text (e.g., "Pizza") in the search field 702 and select (e.g., click) the button 706. As mentioned above, a user may search for a location, the type of entities located in a geographic area, or a specific entity. The location field 704 displays a geographic area of interest (e.g., "San Francisco, CA"). In some embodiments, the geographic area of interest is determined from the location of a client computer, such as from a location determined via a satellite-based positioning system, IP address geo location, etc. In other embodiments, the geographic area of interest is manually input by a user, such as by entering a location in the search field 702.

The search results section 710 includes a title bar 708 identifying the search query (e.g., "Pizza near San Francisco") that resulted in the search results section 710. The search results section 710 includes a number of recommended entities 714 (e.g., "Entity 1," "Entity 2," "Entity 3," and "Entity 4") determined in the manner described above. Various information about each recommended entity 714 is displayed, such as an unassociated score 715 for the entity, a name 716 of the entity, a picture 718 for the entity, and other information 720, e.g., an address (e.g., "Address"), a telephone number (e.g., "Tel. No.), and a price level (e.g., "$$") for each recommended entity 714. As described above, the recommended entities 714 are those entities having associations with contacts from a user's social graph. Accordingly, as described above, each recommended entity 714 is annotated with the association information 722 that resulted in the determination of the recommended entity 714. For example, the association information 722 includes a picture 724 of the contact, the name 726 of the contact (e.g., "Contact 1," "Contact 2," "Contact 3," and "Contact 4"), and evaluations by the contact, e.g., a rating 728, review text 730, or other information or combination thereof from the association. As described above, the association information 722 for each recommended entity 714 is obtained from the highest ranked contact associated with the recommended entity 714.

As noted above, entities without associations may also be included in the search results. Accordingly, as shown in FIG. 7, additional entities 732 without associations may also be displayed in the search results section 710. The entities include similar information to the recommended entities, such as an unassociated score 734 for the entity, a name 736 of the entity, a picture 738 for the entity, and other information 740, e.g., an address (e.g., "Address"), a telephone number (e.g., "Tel. No.), and a price level (e.g., "$$") for each entity 732. As seen in FIG. 7, the recommended entities 714 are displayed as in a first group and in a different position than the additional entities 732. The additional entities 732 are displayed in a second group below the recommended entities 714.

Figure 8:
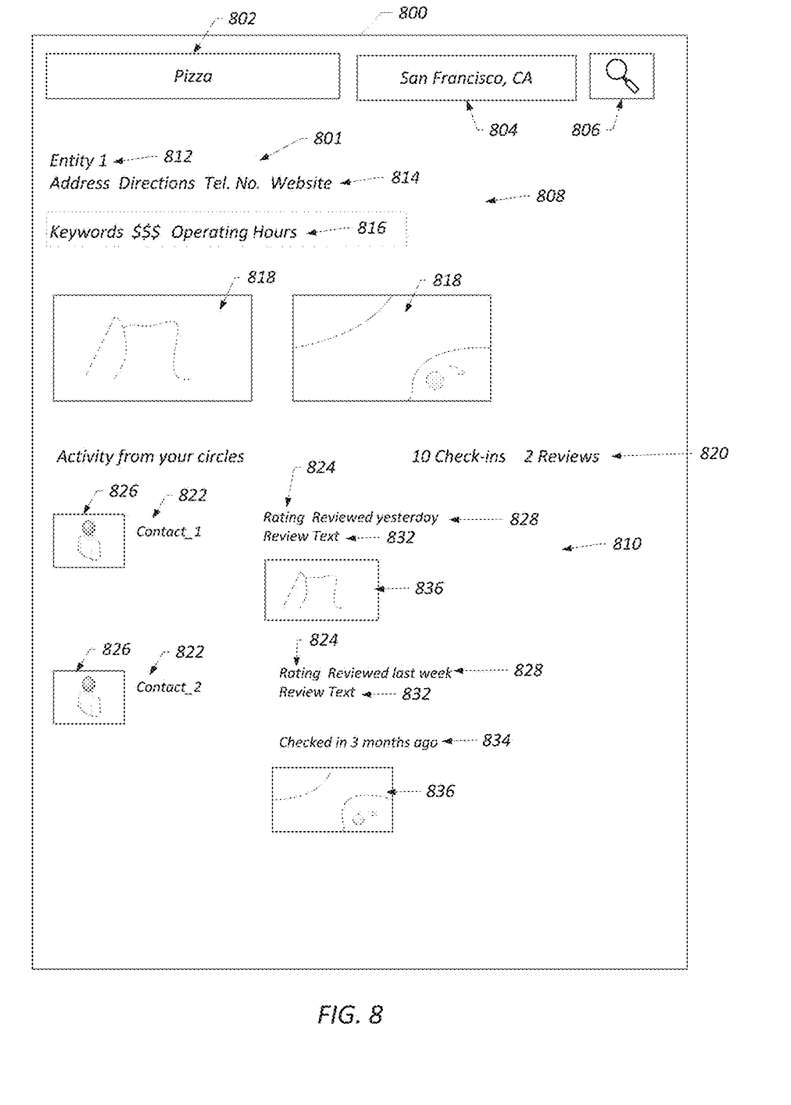
FIG. 8 is a schematic of a screenshot illustrating the display of additional associations for a selected recommended entity determined in accordance with an embodiment of the present invention.

As mentioned above, in some embodiments, a user selects (e.g., clicks) on a recommended entity and obtain additional associations for the selected entity. FIG. 8 depicts a screenshot 800 illustrating the display of additional associations for a selected recommended entity 801 determined in accordance with an embodiment of the present invention. The screenshot 800 is from a browser or other application executing on a client computer, such as the client computer 102 described above. For example, the screenshot 800 depicts a webpage, such as webpage accessed from a landing page for a geographic area or from search results provided by a search engine. The screenshot 800 depicts a search field 802, a location field 804, and a search button 806. Additionally, the screenshot 800 depicts selected entity information 808 and an associations section 810.

The entity information section 808 includes information about the selected entity, such as the name 812, of the entity (e.g., "Entity 1") and contact information 814, such as an address (e.g., "Address"), links to directions (e.g., "Directions"), a telephone number (e.g., "Tel. No."), a link to the entity's website (e.g., "Website"), etc. Additionally, the entity information section 808 includes additional information 816, such as keywords (e.g., "Keywords"), price level (e.g., "$$$"), and operating hours (e.g., "Operating Hours") relating to the entity. Additionally, the entity information section 808 includes pictures 818 associated with the entity and any other information describing the selected entity The associations section 810 includes a title bar 820, contacts 822 (e.g., "Contact 1" and "Contact 2") and associations 824 (e.g., ratings, reviews, etc.) for the entity provided by each contact. The title bar 822 identifies the section as including associations from a social graph (e.g., "Activity from your circles") and identifies the number and type of associations (e.g., "10 Check-ins" and "2 Reviews.")

Figure 9:
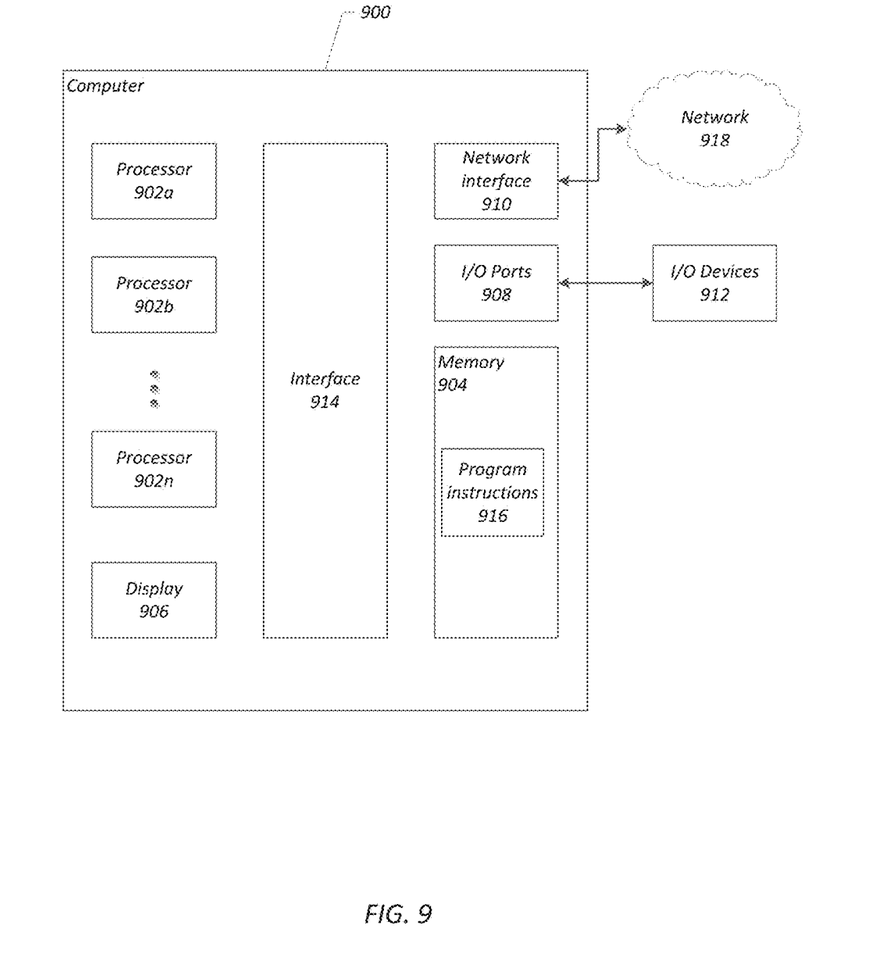
FIG. 9 is a block diagram of a computer in accordance with an embodiment of the present invention.

For example, each contact 822 is displayed with association information, such as a picture 826 for the contact 822, the date 828 of the association, and additional association information (e.g., evaluations such as ratings 824 and review text 832, and a check-in 834). Additionally, a picture 836 for each association is displayed with the association. For example, the pictures 836 include an image provided by a contact's and included in the association. The review text 832 includes a portion of or all of the review text for an entity based on, for example, a size limit for the review text 832. As described above, the contacts 822 are displayed in a ranked list based on ranking criteria for the entity-associated contacts, such as a relationship ranking FIG. 9 depicts a computer 900 in accordance with an embodiment of the present invention. Various sections of systems and methods described herein may include or be executed on one or more computers similar to computer 900 and programmed as special-purpose machines by executing some or all steps of methods described above as executable computer code. Further, processes and modules described herein may be executed by one or more processing systems similar to that of computer 900.

The computer 900 may include various internal and external components that contribute to the function of the device and which may allow the computer 900 to function in accordance with the techniques discussed herein. As will be appreciated, various components of computer 900 may be provided as internal or integral components of the computer 900 or may be provided as external or connectable components. It should further be noted that FIG. 9 depicts merely one example of a particular implementation and is intended to illustrate the types of components and functionalities that may be present in computer 900.

Computer 900 may include any combination of devices or software that may perform or otherwise provide for the performance of the techniques described herein. For example, computer 900 may include or be a combination of a cloud-computing system, a data center, a server rack or other server enclosure, a server, a virtual server, a desktop computer, a laptop computer, a tablet computer, a mobile telephone, a personal digital assistant (PDA), a media player, a game console, a vehicle-mounted computer, or the like. The computer 900 may be a unified device providing any one of or a combination of the functionality of a media player, a cellular phone, a personal data organizer, a game console, and so forth. Computer 900 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

In addition, the computer 900 may allow a user to connect to and communicate through a network 916 (e.g., the Internet, a local area network, a wide area network, etc.) and may provide communication over a satellite-based positioning system (e.g., GPS). For example, the computer 900 may allow a user to communicate using e-mail, text messaging, instant messaging, or using other forms of electronic communication, and may allow a user to obtain the location of the device from the satellite-based positioning system, such as the location on an interactive map. As shown in FIG. 9, the computer 900 may include one or more processors (e.g., processors 902a-902n) coupled to a memory 904, a display 906, I/O ports 908 and a network interface 910, via an interface 914.

In one embodiment, the display 906 may include a liquid crystal display (LCD) or an organic light emitting diode (OLED) display, although other display technologies may be used in other embodiments. The display 906 may display a user interface (e.g., a graphical user interface). The display 906 may also display various function and system indicators to provide feedback to a user, such as power status, call status, memory status, etc. These indicators may be incorporated into the user interface displayed on the display 906. In accordance with some embodiments, the display 906 may include or be provided in conjunction with touch sensitive elements through which a user may interact with the user interface. Such a touch-sensitive display may be referred to as a "touch screen" and may also be known as or called a touch-sensitive display system.

The processor 902 may provide the processing capability required to execute the operating system, programs, user interface, and any functions of the computer 900. The processor 902 may include one or more processors, such as general and special purpose microprocessors, such as ASICs. For example, the processor 902 may include one or more reduced instruction set (RISC) processors, such as those implementing the Advanced RISC Machine (ARM) instruction set. Additionally, the processor 902 may include single-core processors and multicore processors and may include graphics processors, video processors, and related chip sets. A processor may receive instructions and data from a memory (e.g., system memory 904). Accordingly, computer 900 may be a uni-processor system including one processor (e.g., processor 902a), or a multi-processor system including any number of suitable processors (e.g., 902a-902n). Multiple processors may be employed to provide for parallel or sequential execution of one or more sections of the techniques described herein. Processes, such as logic flows, described herein may be performed by one or more programmable processors executing one or more computer programs to perform functions by operating on input data and generating corresponding output.

The memory 904 (which may include tangible non-transitory computer readable storage mediums) may include volatile memory and non-volatile memory accessible by the processor 902 and other components of the computer 900. The memory 904 may store a variety of information and may be used for a variety of purposes. For example, the memory 904 may store application instructions, such as the firmware for the computer 900, an operating system for the computer 900, and any other programs or executable code necessary for the computer 900 to function. Program instructions 916 may be executable by a processor (e.g., one or more of processors 902a-902n) to implement one or more embodiments of the present techniques. Instructions 916 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, a subroutine. A computer program may or may not correspond to a file in a file system. A program may be stored in a section of a file that holds other programs or data (e.g., one or more scripts stored in a markup language document), in a single file dedicated to the program in question, or in multiple coordinated files (e.g., files that store one or more modules, sub programs, or sections of code). A computer program may be deployed to be executed on one or more computer processors located locally at one site or distributed across multiple remote sites and interconnected by a communication network. In addition, the memory 904 may be used for buffering or caching during operation of the computer 900.

As mentioned above, the memory 904 may include volatile memory, such as random access memory (RAM). The memory 904 may also include non-volatile memory, such as ROM, flash memory, a hard drive, any other suitable optical, magnetic, or solid-state storage medium, or a combination thereof. The memory 904 may store data files such as media (e.g., music and video files), software (e.g., for implementing functions on computer 900), preference information (e.g., media playback preferences), lifestyle information (e.g., food preferences), exercise information (e.g., information obtained by exercise monitoring equipment), transaction information (e.g., information such as credit card information), wireless connection information (e.g., information that may enable a media device to establish a wireless connection such as a telephone connection), subscription information (e.g., information that maintains a record of podcasts or television shows or other media a user subscribes to), telephone information (e.g., telephone numbers), and any other suitable data.

The interface 914 may include multiple interfaces and may couple various components of the computer 900 to the processor 902 and memory 904. In some embodiments, the interface 914, the processor 902, memory 904, and one or more other components of the computer 900 may be implemented on a single chip, such as a system-on-a-chip (SOC). In other embodiments, these components, their functionalities, or both may be implemented on separate chips. The interface 914 may be configured to coordinate I/O traffic between processors 902*a*-902*n*, system memory 904, network interface 910, I/O devices 912, other peripheral devices, or a combination thereof. The interface 914 may perform protocol, timing or other data transformations to convert data signals from one component (e.g., system memory 904) into a format suitable for use by another component (e.g., processors 902*a*-902*n*). The interface 914 may include support for devices attached through various types of peripheral buses, such as a variant of the Peripheral Component Interconnect (PCI) bus standard or the Universal Serial Bus (USB) standard.

The computer 900 may also include an input and output port 908 to allow connection of additional devices. For example, the port 908 may be a headphone jack that provides for connection of headphones. Additionally, the port 908 may have both input/output capabilities to provide for connection of a headset (e.g. a headphone and microphone combination). Embodiments of the present invention may include any number of input and output ports 908, including headphone and headset jacks, universal serial bus (USB) ports, Firewire or IEEE-1394 ports, and AC and DC power connectors. Further, the computer 900 may use the input and output ports to connect to and send or receive data with any other device, such as other portable computers, personal computers, printers, etc. For example, in one embodiment the computer 900 may connect to a personal computer via a USB connection to send and receive data files, such as applications, media files, etc.

The computer 900 depicted in FIG. 9 also includes a network interface 910, such as a wired network interface card (NIC), wireless (e.g., radio frequency) receivers, etc. For example, the network interface 910 may receive and send electromagnetic signals and communicate with communications networks and other communications devices via the electromagnetic signals. The network interface 910 may include known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The network interface 910 may communicate with networks (e.g., network 916), such as the Internet, an intranet, a cellular telephone network, a wireless local area network (LAN), a metropolitan area network (MAN), or other devices by wireless communication. The communication may use any suitable communications standard, protocol and technology, including Ethernet, Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11a, IEEE 802.11b, IEEE 802.11g or IEEE 802.11n), voice over Internet Protocol (VoIP), Wi-MAX, a protocol for email (e.g., Internet message access protocol (IMAP) or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), Multimedia Messaging Service (MMS), Short Message Service (SMS), or any other suitable communication protocol.

Those skilled in the art will also appreciate that, while various items are illustrated as being stored in memory or on storage while being used, these items or sections of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer 900 may be transmitted to computer 900 via transmission media or signals such as electrical, electromagnetic, or digital signals, conveyed via a communication medium such as a network or a wireless link. Various embodiments may further include receiving, sending or storing instructions or data implemented in accordance with the foregoing description upon a computer-accessible medium. Accordingly, the present invention may be practiced with other computer system configurations.

Various embodiments may further include receiving, sending or storing instructions and data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network or a wireless link.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method for displaying a recommended entity based on a user's social graph, the method comprising:
   receiving, at one or more processors, a search query from a user including a geographic area;
   providing, by the one or more processors, a plurality of entities within the geographic area that match the search query;
   receiving, at one or more processors, a selection of one of the plurality of entities by the user;
   obtaining, by the one or more processors, a plurality of contacts from an asymmetric social graph for the user;
   determining, by the one or more processors, one or more associations between one or more of the plurality of contacts and the selected entity, each association including a rating of the entity, a review of the entity, or a combination thereof; and
   displaying, by the one or more processors, an indication of the entity with an indication of the one or more contacts and association information from the one or more associations between the one or more contacts and the selected entity.

2. The computer-implemented method of claim 1, further comprising:
   displaying, by the one or more processors, an indication of a relationship between the user and each of the one or more contacts with the display of the indication of the entity.

3. The computer-implemented method of claim 1, further comprising:
   displaying, by the one or more processors, an indication of a number of associations between the one or more contacts and the selected entity with the display of the indication of the entity.

4. The computer-implemented method of claim 1, further comprising:
   ranking, by the one or more processors, the one or more contacts according to relationship criteria indicative of a relationship between each of the one or more contacts and the user; and
   displaying, by the one or more processors, the association information from the one or more associations in a ranked order based on the ranking of the respective one or more contacts.

5. The computer-implemented method of claim 4, wherein the relationship criteria includes a number and a type of interactions between each of the one or more contacts and the user.

6. The computer-implemented method of claim 1, wherein:
   the indication of the one or more contacts includes a picture of the one or more contacts; and
   the association information for each of the one or more contacts includes text of a review by the contact, a rating by the contact, a check-in by the contact, a date and time of the review, rating, or check-in by the contact, or an image provided by the contact.

7. A non-transitory computer-readable storage medium having executable computer code stored thereon, the code comprising a set of instructions that is executed by one or more processors to cause a computing device to:
   receive a search query from a user including a geographic area;
   provide a plurality of entities within the geographic area that match the search query;
   receive a selection of one of the plurality entities by the user;
   obtain a plurality of contacts from an asymmetric social graph for the user;
   determine one or more associations between one or more of the plurality of contacts and the selected entity, each association including a rating of the entity, a review of the entity, or a combination thereof; and
   display an indication of the entity with an indication of the one or more contacts and association information from the one or more associations between the one or more contacts and the selected entity.

8. The computer-readable storage medium of claim 7, wherein the set of instructions further causes the computing device to:
display an indication of a relationship between the user and each of the one or more contacts with the display of the indication of the entity.

9. The computer-readable storage medium of claim 7, wherein the set of instructions further causes the computing device to:
display an indication of a number of associations between the one or more contacts and the selected entity with the display of the indication of the entity.

10. The computer-readable storage medium of claim 7, wherein the set of instructions further causes the computing device to:
rank the one or more contacts according to relationship criteria indicative of a relationship between each of the one or more contacts and the user; and
display the association information from the one or more associations in a ranked order based on the ranking of the respective one or more contacts.

11. The computer-readable storage medium of claim 10, wherein the relationship criteria includes a number and a type of interactions between each of the one or more contacts and the user.

12. The computer-readable storage medium of claim 7, wherein
the indication of the one or more contacts includes a picture of the one or more contacts; and
the association information for each of the one or more contacts includes text of a review by the contact, a rating by the contact, a check-in by the contact, a date and time of the review, rating, or check-in by the contact, or an image provided by the contact.

13. A computing device comprising:
a user interface;
one or more processors coupled to the user interface and;
a non-transitory computer-readable memory coupled to the one or more processors and storing thereon instructions that is executed by the one or more processors to cause the computing device to:
receive a search query from a user including a geographic area;
provide a plurality of entities within the geographic area that match the search query;
receive a selection of one of the plurality of entities by the user;
obtain a plurality of contacts from an asymmetric social graph for the user;
determine one or more associations between one or more of the plurality of contacts and the selected entity, each association including a rating of the entity, a review of the entity, or a combination thereof; and
display, via the user interface, an indication of the entity with an indication of the one or more contacts and association information from the one or more associations between the one or more contacts and the selected entity.

14. The computing device of claim 13, wherein the instructions further cause the computing device to:
display an indication of a relationship between the user and each of the one or more contacts with the display of the indication of the entity.

15. The computing device of claim 13, wherein the instructions further cause the computing device to:
display an indication of a number of associations between the one or more contacts and the selected entity with the display of the indication of the entity.

16. The computing device of claim 13, wherein the instructions further cause the computing device to:
rank the one or more contacts according to relationship criteria indicative of a relationship between each of the one or more contacts and the user; and
display the association information from the one or more associations in a ranked order based on the ranking of the respective one or more contacts.

17. The computing device of claim 16, wherein the relationship criteria includes a number and a type of interactions between each of the one or more contacts and the user.

* * * * *